(12) United States Patent
Liu et al.

(10) Patent No.: US 11,823,491 B2
(45) Date of Patent: Nov. 21, 2023

(54) PROCESSING APPARATUS, PROCESSING METHOD, AND NON-TRANSITORY STORAGE MEDIUM

(71) Applicant: NEC Corporation, Tokyo (JP)

(72) Inventors: Jianquan Liu, Tokyo (JP); Satoshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 169 days.

(21) Appl. No.: 17/436,725

(22) PCT Filed: Dec. 2, 2019

(86) PCT No.: PCT/JP2019/046990
§ 371 (c)(1),
(2) Date: Sep. 7, 2021

(87) PCT Pub. No.: WO2020/188898
PCT Pub. Date: Sep. 24, 2020

(65) Prior Publication Data
US 2022/0189199 A1   Jun. 16, 2022

(30) Foreign Application Priority Data

Mar. 15, 2019  (JP) ................................. 2019-048454

(51) Int. Cl.
*G06V 40/16* (2022.01)
*G06V 10/74* (2022.01)
(Continued)

(52) U.S. Cl.
CPC .............. *G06V 40/172* (2022.01); *G06T 7/20* (2013.01); *G06V 10/761* (2022.01); *G06V 10/7625* (2022.01)

(58) Field of Classification Search
None
See application file for complete search history.

(56) References Cited

U.S. PATENT DOCUMENTS

2015/0356129 A1    12/2015  Liu
2015/0373404 A1*   12/2015  Fukazawa ............ H04N 21/462
                                                              725/53

FOREIGN PATENT DOCUMENTS

JP          2006-343791 A       12/2006
JP          2006343791 A    *   12/2006
                (Continued)

OTHER PUBLICATIONS

International Search Report for PCT Application No. PCT/JP2019/046990, dated Feb. 10, 2020.
(Continued)

*Primary Examiner* — Delomia L Gilliard
(74) *Attorney, Agent, or Firm* — Sughrue Mion, PLLC

(57) ABSTRACT

The present invention provides a processing apparatus (10) including an inter-face-image-group determination unit (11) that determines whether a similarity score between a first representative face image in a first face image group and a second representative face image in a second face image group satisfies a first condition, an intra-face-image-group determination unit (12) that determines, for each of the first face image group and the second face image group, whether a second condition defining a relationship between the representative face image and another image in the face image group is satisfied, based on a similarity score between the first representative face image and each of other face images in the first face image group and a similarity score between the second representative face image and each of other face images in the second face image group, and a processing unit (13) that associates a same person identifier (ID) with a plurality of face images included in the first face image group and the second face image group when it is determined that the first condition is satisfied and that the
(Continued)

first face image group and the second face image group each satisfy the second condition.

10 Claims, 10 Drawing Sheets

(51) Int. Cl.
    *G06V 10/762*    (2022.01)
    *G06T 7/20*      (2017.01)

(56)        References Cited

FOREIGN PATENT DOCUMENTS

| JP | 2014-139733 A | 7/2014 | |
|---|---|---|---|
| JP | 2015-049574 A | 3/2015 | |
| WO | 2014/109127 A1 | 7/2014 | |
| WO | WO-2014109127 A1 * | 7/2014 | ......... G06F 16/2246 |

OTHER PUBLICATIONS

Alper Yilmaz et al., "Object Tracking: A Survey", ACM Computing Surveys, vol. 38, No. 4, Article 13, Dec. 2006, pp. 1-45.

* cited by examiner

FIG. 4

| FIRST FACE IMAGE GROUP | SECOND FACE IMAGE GROUP |
|---|---|
| SIMILARITY SCORE (M3,M1) | SIMILARITY SCORE (N1,N2) |
| 〃 (M3,M2) | 〃 (N1,N3) |
| 〃 (M3,M4) | 〃 (N1,N4) |
| ⋮ | ⋮ |

FIG. 5

| FACE IMAGE ID | PERSON ID |
|---|---|
| F001-0001 | 000001 |
| F001-0002 | 000003 |
| ⋮ | ⋮ |

PROCESSING APPARATUS, PROCESSING METHOD, AND NON-TRANSITORY STORAGE MEDIUM

This application is a National Stage Entry of PCT/JP2019/046990 filed on Dec. 2, 2019, which claims priority from Japanese Patent Application 2019-048454 filed on Mar. 15, 2019, the contents of all of which are incorporated herein by reference, in their entirety.

TECHNICAL FIELD

The present invention relates to a processing apparatus, a processing method, and a program.

BACKGROUND ART

Non-Patent Document 1 discloses an object tracking technique for tracking the same object included in a video. Patent Documents 1 and 2 disclose a generation method of index data for gathering and grouping together a plurality of face images of the same person.

RELATED DOCUMENT

Patent Document

[Patent Document 1] International Publication No. WO2014/109127
[Patent Document 2] Japanese Patent Application Publication No. 2015-49574

Non-Patent Document

[NPL 1] "Object Tracking: A Survey", "online", "retrieved on Dec. 26, 2017", Internet <URL:http://citeseerx.ist.psu.edu/viewdoc/download?doi=10.1.1.112.8588&rep=rep1&type=pdf>

DISCLOSURE OF THE INVENTION

Technical Problem

A technique for efficiently grouping face images of the same person extracted from a plurality of frames is desired. Face images of the same person successively captured with the same camera can be grouped by utilizing an object tracking technique and tracking the same person. However, in a case of the object tracking technique, it is difficult to group face images of the same person captured with differing cameras, face images of the same person who has once framed out and then framed in, or the like.

An object of the present invention is to provide a technique for efficiently grouping face images of the same person extracted from a plurality of frames.

Solution to Problem

The present invention provides a processing apparatus including:

an inter-face-image-group determination means for determining whether a similarity score between a first representative face image in a first face image group and a second representative face image in a second face image group satisfies a first condition;

an intra-face-image-group determination means for determining, for each of the first face image group and the second face image group, whether a second condition defining a relationship between the representative face image and another image in the face image group is satisfied, based on a similarity score between the first representative face image and each of other face images in the first face image group and a similarity score between the second representative face image and each of other face images in the second face image group; and a processing means for associating a same person identifier (ID) with a plurality of face images included in the first face image group and the second face image group when it is determined that the first condition is satisfied and that the first face image group and the second face image group each satisfy the second condition.

The present invention provides a processing method executing:

by a computer, an inter-face-image-group determination step of determining whether a similarity score between a first representative face image in a first face image group and a second representative face image in a second face image group satisfies a first condition;

an intra-face-image-group determination step of determining, for each of the first face image group and the second face image group, whether a second condition defining a relationship between the representative face image and another image in the face image group is satisfied, based on a similarity score between the first representative face image and each of other face images in the first face image group and a similarity score between the second representative face image and each of other face images in the second face image group; and a processing step of associating a same person identifier (ID) with a plurality of face images included in the first face image group and the second face image group when it is determined that the first condition is satisfied and that the first face image group and the second face image group each satisfy the second condition.

The present invention provides a program that causes a computer to function as:

an inter-face-image-group determination means for determining whether a similarity score between a first representative face image in a first face image group and a second representative face image in a second face image group satisfies a first condition;

an intra-face-image-group determination means for determining, for each of the first face image group and the second face image group, whether a second condition defining a relationship between the representative face image and another image in the face image group is satisfied, based on a similarity score between the first representative face image and each of other face images in the first face image group and a similarity score between the second representative face image and each of other face images in the second face image group; and a processing means for associating a same person identifier (ID) with a plurality of face images included in the first face image group and the second face image group when it is determined that the first condition is satisfied and that the first face image group and the second face image group each satisfy the second condition.

Advantageous Effects of Invention

The present invention achieves a technique for efficiently grouping face images of the same person extracted from a plurality of frames.

BRIEF DESCRIPTION OF THE DRAWINGS

The above-described object, the other objects, features, and advantages will become more apparent from a suitable example embodiment described below and the following accompanying drawings.

FIG. 4 is a diagram schematically illustrating one example of information processed by the processing apparatus according to the present example embodiment.

FIG. 5 is a diagram schematically illustrating one example of information processed by the processing apparatus according to the present example embodiment.

DESCRIPTION OF EMBODIMENTS

First Example Embodiment

Figure 1:
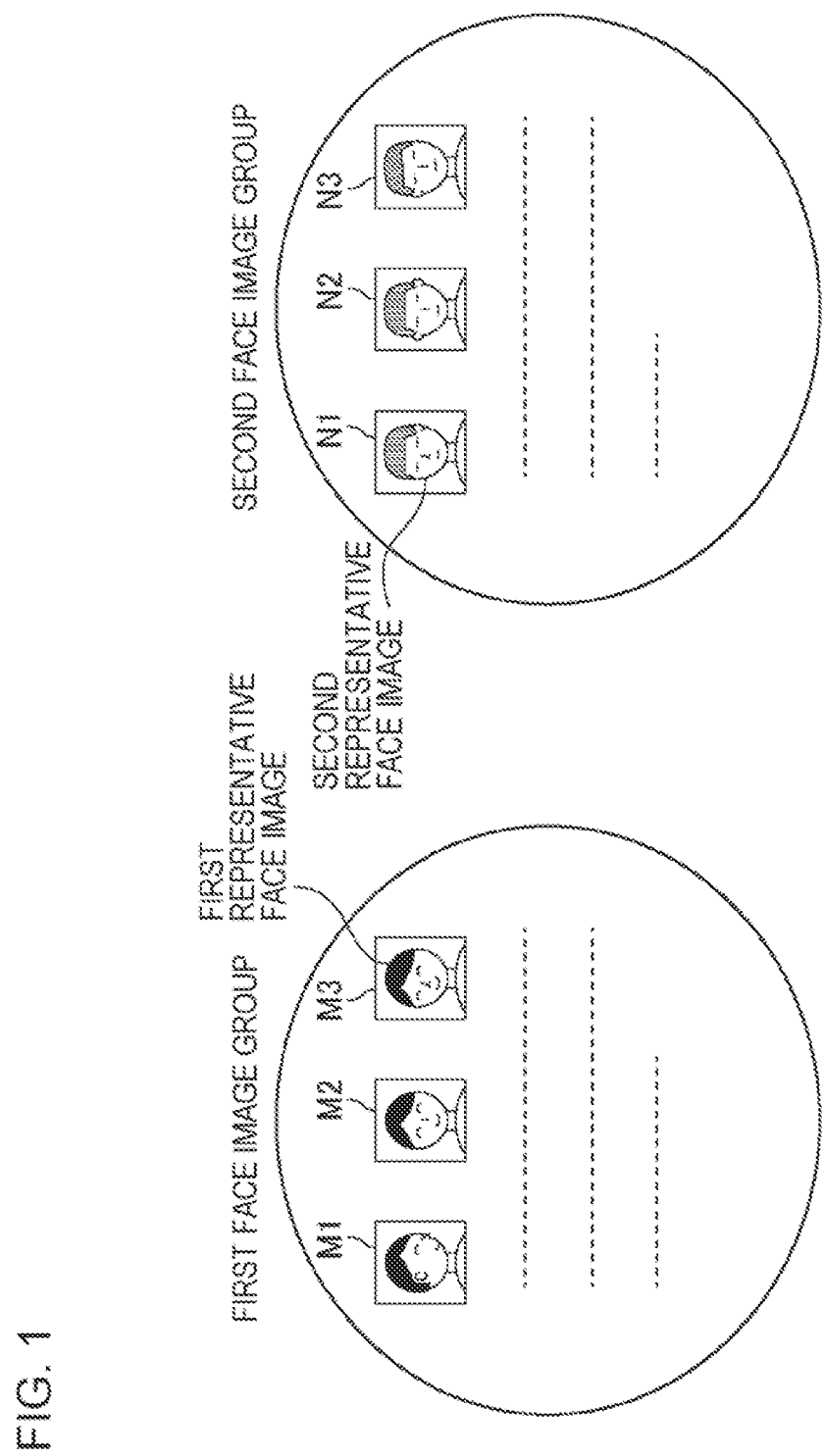
FIG. 1 is a diagram illustrating an outline of processing performed by a processing apparatus according to the present example embodiment.

First, an outline of processing performed by a processing apparatus according to the present example embodiment is described. As illustrated in FIG. 1, the processing apparatus targets a first face image group and a second face image group for processing. The first face image group is composed of a plurality of face images estimated, by any means, to be face images of the same person. Moreover, the second face image group is composed of a plurality of face images estimated, by any means, to be face images of the same person.

The processing apparatus determines whether the first face image group and the second face image group is a collection of face images of the same person. The processing apparatus performs the determination by use of two determinations that are a "determination of a similarity score between face image groups using a representative image" and a "determination of a similarity score between a representative image in a face image group and another image".

Specifically, the processing apparatus determines whether a similarity score between a first representative face image being a representative in the first face image group and a second representative face image being a representative in the second face image group satisfies a first condition, i.e., whether the first representative face image and the second representative face image are similar at a predetermined level or more.

Moreover, the processing apparatus determines, based on a similarity score between the first representative face image and each of other face images in the first face image group, whether a relationship between the first representative face image and another image in the first face image group satisfies a second condition, i.e., whether the first representative face image and the another image in the first face image group are similar at a predetermined level or more.

Furthermore, the processing apparatus determines, based on a similarity score between the second representative face image and each of other face images in the second face image group, whether a relationship between the second representative face image and another image in the second face image group satisfies a second condition, i.e., whether the second representative face image and the another image in the second face image group are similar at a predetermined level or more.

Then, the processing apparatus associates the same person ID with a plurality of face images included in the first face image group and the second face image group when a relationship between the first representative face image and the second representative face image satisfies a first condition (the first representative face image and the second representative face image are similar at a predetermined level or more), the first face image group satisfies a second condition (the first representative face image and another face image of the first face image group are similar at a predetermined level or more), and the second face image group satisfies a second condition (the second representative face image and another face image of the second face image group are similar at a predetermined level or more).

Next, a configuration of the processing apparatus is described in detail. First, one example of a hardware configuration of the processing apparatus is described. Each function unit included in the processing apparatus is achieved by any combination of hardware and software including a central processing unit (CPU) of any computer, a memory, a program loaded onto the memory, a storage unit such as a hard disk that stores the program (that can store not only a program previously stored from a stage of shipping an apparatus but also a program downloaded from a storage medium such as a compact disc (CD), a server on the Internet, or the like), and an interface for network connection. Then, it is appreciated by a person skilled in the art that there are a variety of modification examples of methods and apparatuses for the achievement.

Figure 2:
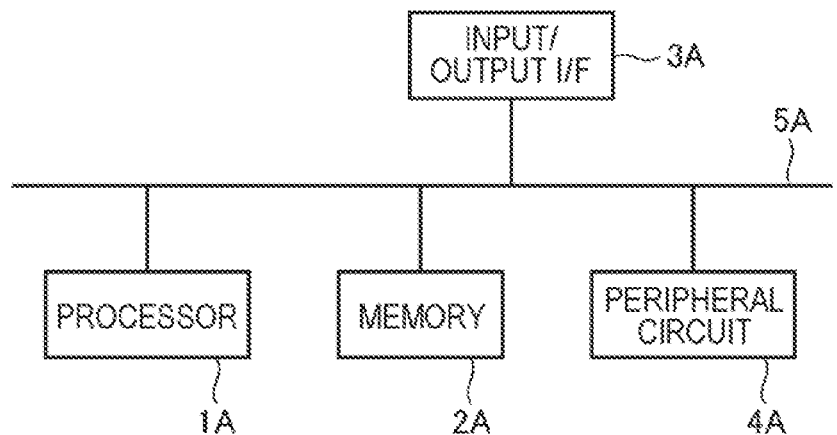
FIG. 2 is a diagram illustrating one example of a hardware configuration of the processing apparatus according to the present example embodiment.

FIG. 2 is a block diagram illustrating a hardware configuration of the processing apparatus according to the present example embodiment. As illustrated in FIG. 2, the processing apparatus includes a processor 1A, a memory 2A, an input/output interface 3A, a peripheral circuit 4A, and a bus 5A. The peripheral circuit 4A includes various modules. The processing apparatus may not include the peripheral circuit 4A. Note that, the processing apparatus may be constituted of a plurality of physically separated apparatuses. In this case, each of the plurality of apparatuses can include the above-described hardware configuration.

The bus 5A is a data transmission path through which the processor 1A, the memory 2A, the peripheral circuit 4A, and the input/output interface 3A mutually transmit and receive data. The processor 1A is, for example, an arithmetic processing apparatus such as a CPU or a graphics processing unit (GPU). The memory 2A is, for example, a memory such as a random access memory (RAM) or a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, or the like. The output apparatus is, for example, a display, a speaker, a printer, a mailer, or the like. The processor 1A can issue a command to each module, and perform an arithmetic operation, based on a result of the arithmetic operation by each of the modules.

Figure 3:
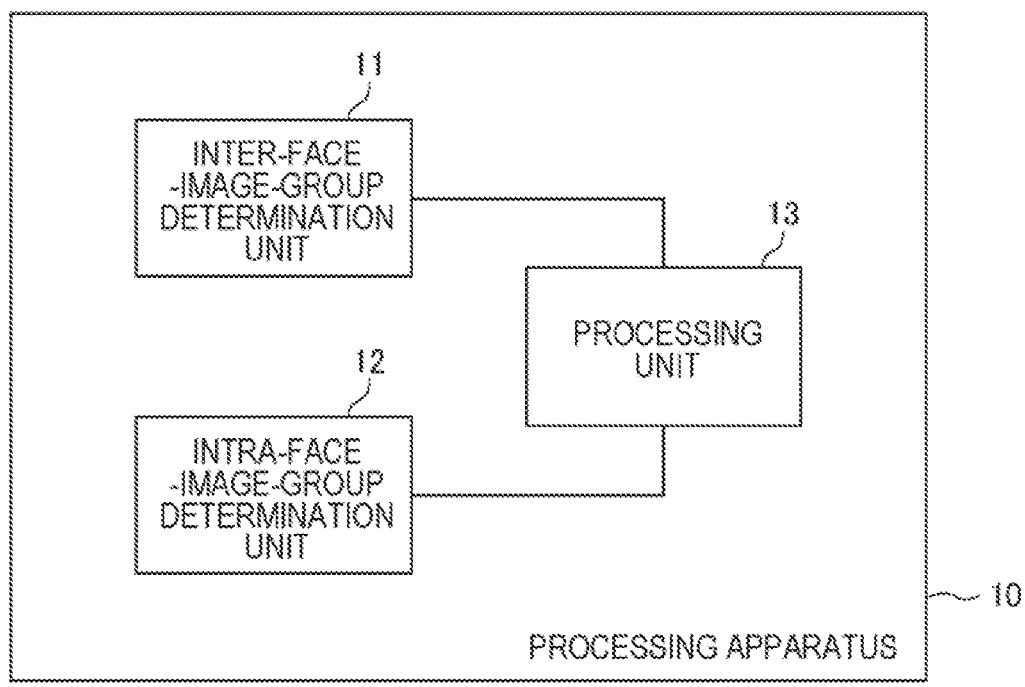
FIG. 3 is a diagram illustrating one example of a functional block diagram of the processing apparatus according to the present example embodiment.

Next, a functional configuration of the processing apparatus is described. One example of a functional block diagram of a processing apparatus 10 in FIG. 3 is illustrated. As illustrated, the processing apparatus 10 includes an inter-face-image-group determination unit 11, an intra-face-image-group determination unit 12, and a processing unit 13.

The inter-face-image-group determination unit 11 determines whether a similarity score between a first representative face image in a first face image group and a second representative face image in a second face image group satisfies a first condition. The first condition is, for example, "a similarity score is equal to or more than a reference value (the first representative face image and the second representative face image are similar at a reference level or more)".

The first face image group is composed of a plurality of face images estimated, by any means, to be face images of the same person. Moreover, the second face image group is composed of a plurality of face images estimated, by any means, to be face images of the same person. For example, the first face image group may be a collection of face images in each of a plurality of frames of a person (object) tracked as the same object across the plurality of frames by an object tracking technique. Similarly, the second face image group may be a collection of face images in each of a plurality of frames of a person (object) tracked as the same object across the plurality of frames by an object tracking technique. Any conventional technique can be adopted as the object tracking technique. A plurality of face images may be face images extracted from each of a plurality of frames included in moving image data generated with the same camera, may be face images extracted from each of a plurality of frames included in a plurality of pieces of moving image data generated with a plurality of cameras, or may be other face images. Note that, the first face image group and the second face image group may each be a collection of a plurality of face images estimated to be face images of the same person by other means.

The first representative face image is one face image in the first face image group. The second representative face image is one face image in the second face image group. In the present example embodiment, a method of determining a representative face image from a face image group is not particularly limited. Any conventional technique can be adopted for computation of a similarity score between two face images.

The intra-face-image-group determination unit 12 determines, based on a similarity score between the first representative face image and each of other face images in the first face image group, whether a relationship between the first representative face image and another image in the first face image group satisfies a second condition. Moreover, the intra-face-image-group determination unit 12 determines, based on a similarity score between the second representative face image and each of other face images in the second face image group, whether a relationship between the second representative face image and another image in the second face image group satisfies a second condition.

The second condition is, for example, "face images whose similarity score to a representative face image is equal to or more than a predetermined level exist in a face image group in a predetermined ratio or more".

As illustrated in FIG. 4, the intra-face-image-group determination unit 12 computes a similarity score between a representative face image and each of other face images in each of the first face image group and the second face image group, and determines, based on a computation result, whether each of the first image group and the second image group satisfies a second condition.

Since the first representative face image is M3 in the example of FIG. 1, a similarity score is computed for each pair of the representative face image M3 and each of other face images in the first face image group in the example of FIG. 4. Moreover, since the second representative face image is N1 in the example of FIG. 1, a similarity score is computed for each pair of the representative face image N1 and each of other face images in the second face image group in the example of FIG. 4.

The intra-face-image-group determination unit 12 computes a ratio of face images, existing in the face image group, whose similarity score to the representative face image is equal to or more than a predetermined level, by dividing, by the total number of pairs, the number of pairs whose similarity score is equal to or more than a predetermined level defined in the second condition. Then, the intra-face-image-group determination unit 12 can determine whether the computed ratio is equal to or more than a predetermined ratio defined in the second condition.

When it is determined that the first condition is satisfied and that both of the first face image group and the second face image group satisfy the second condition, the processing unit 13 associates the same person ID with a plurality of face images included in the first face image group and the second face image group. One example of information processed by the processing unit 13 is schematically illustrated in FIG. 5. In the illustrated example, a face image ID identifying each of a plurality of face images and a person ID identifying each of a plurality of persons captured in an image are related to each other.

Figure 6:
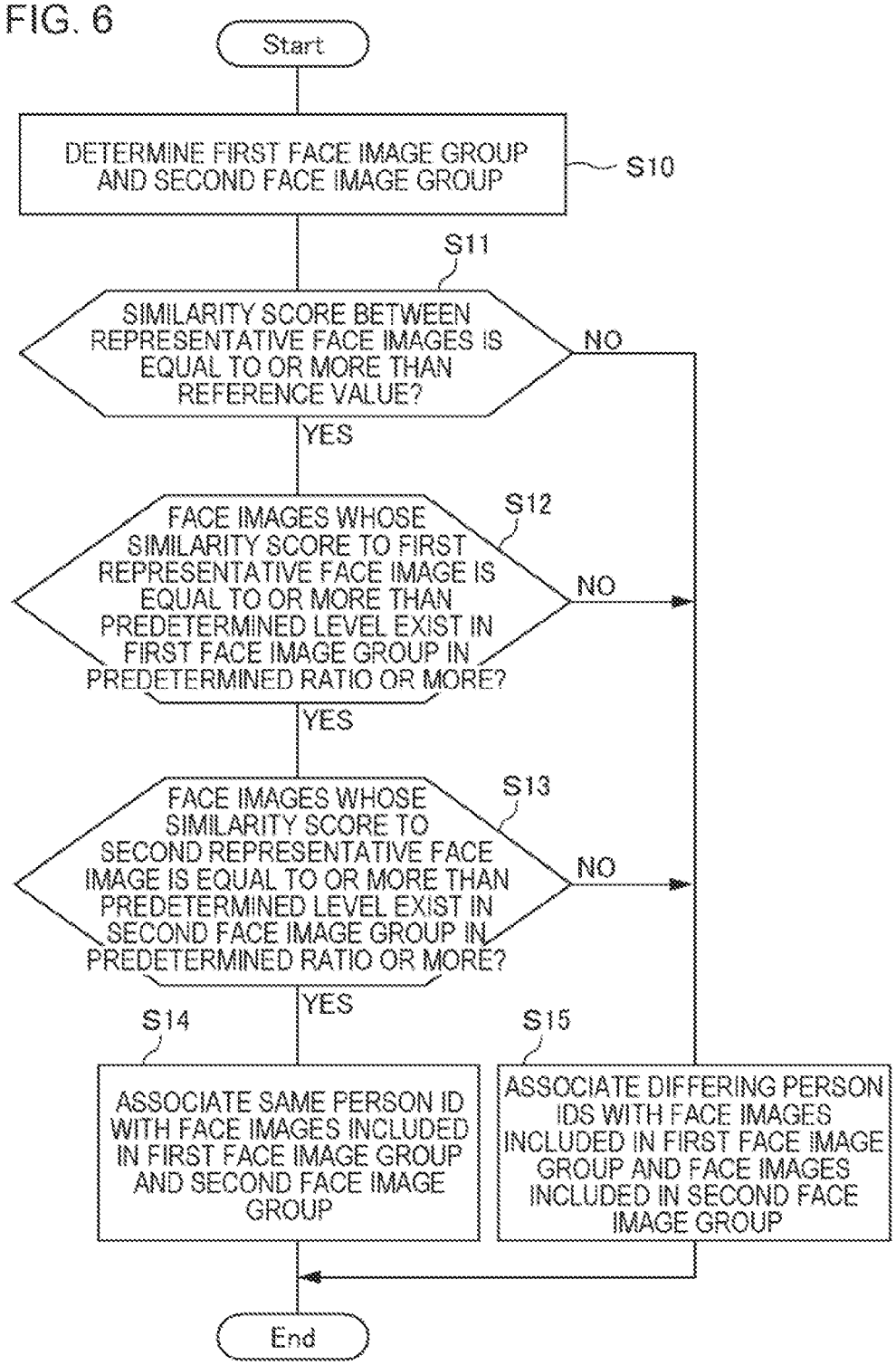
FIG. 6 is a flowchart illustrating one example of a flow of processing in the processing apparatus according to the present example embodiment.

Next, one example of a flow of processing in the processing apparatus 10 is described by use of a flowchart of FIG. 6.

First, the processing apparatus 10 determines a first face image group and a second face image group to be processing targets (S10). Although a determination method of the first face image group and the second face image group is not particularly limited, one example is described in the following example embodiment.

Subsequently, the processing apparatus 10 determines whether a similarity score between a first representative face image in the first face image group and a second representative face image in the second face image group satisfies a first condition (S11). The first condition is, for example, "a similarity score is equal to or more than a reference value (the first representative face image and the second representative face image are similar at a reference level or more)".

When a result of the determination in S11 is Yes, the processing apparatus 10 determines, based on a similarity score between the first representative face image and each of other face images in the first face image group, whether a relationship between the first representative face image and another image in the first face image group satisfies a second condition (S12). The second condition is, for example, "face images whose similarity score to a representative face image is equal to or more than a predetermined level exist in a face image group in a predetermined ratio or more".

When a result of the determination in S12 is Yes, the processing apparatus 10 determines, based on a similarity score between the second representative face image and each of other face images in the second face image group, whether a relationship between the second representative face image and another image in the second face image group satisfies a second condition (S13). The second condition is, for example, "face images whose similarity score to a representative face image is equal to or more than a predetermined level exist in a face image group in a predetermined ratio or more".

When a result of the determination in S13 is Yes, the processing apparatus 10 associates the same person ID with a plurality of face images included in the first face image group and the second face image group (S14).

On the other hand, when a result of the determination in S11 is No, when a result of the determination in S12 is No, or when a result of the determination in S13 is No, the processing apparatus 10 associates differing person IDs with a plurality of face images included in the first face image group and a plurality of face images included in the second face image group (S15).

Note that, a determination order of S11 to S13 is not limited to the illustrated example.

Herein, a modification example is described. When a result of the determination in S11 is No, when a result of the determination in S12 is No, or when a result of the determination in S13 is No, prior to S15, processing in S11 to S13 may be executed after changing at least either one of the first representative face image and the second representative face image to another face image. Then, when the processing is not able to advance to S14 even when similar processing is repeated a predetermined number of times, the processing may advance to S15.

The processing apparatus 10 according to the present example embodiment described above determines whether two face image groups is a collection of face images of the same person, by use of two determinations that are "determination of a similarity score between face image groups using a representative image" and a "determination of a similarity score between a representative image in a face image group and another image".

Whether a face image being appropriate as a representative image is specified can be determined by performing "determination of a similarity score between a representative image in a face image group and another image". Even a collection of face images determined to be of the same person can differ from one another in a direction, expression, and the like of a face. It is preferable that a representative face image is a face image that fully represents a feature of a face image common to such diverse face images. With the determination, whether a face image that fully represents a feature of a face image common to diverse face images in a face image group is specified as a representative image can be determined.

Then, whether the first face image group and the second face image group are so similar as can be determined to be of the same thing can be determined by performing "determination of a similarity score between face image groups using a representative image".

The processing apparatus 10 can efficiently and highly accurately determine whether two face image groups is a collection of face images of the same person. As a result, it becomes possible to efficiently group together face images extracted from each of a plurality of frames by face images of the same person.

Second Example Embodiment

The present example embodiment differs from the first example embodiment in generating index data having a hierarchical structure with a plurality of face images, and executing processing described in the first example embodiment by utilizing the index data. The present example embodiment is described below in detail.

One example of a hardware configuration of a processing apparatus 10 is similar to that according to the first example embodiment.

Figure 7:
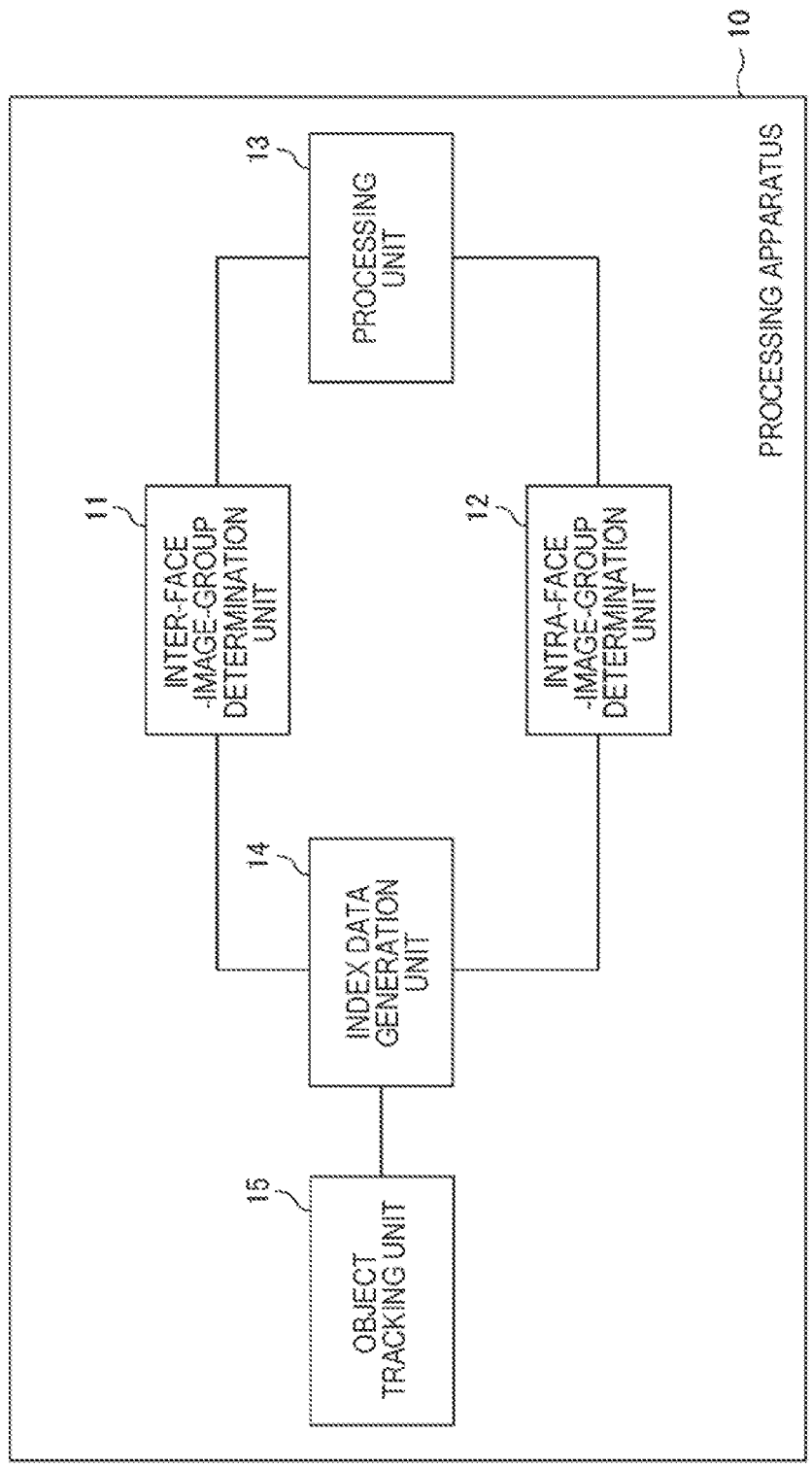
FIG. 7 is a diagram illustrating one example of a functional block diagram of the processing apparatus according to the present example embodiment.

One example of a functional block diagram of the processing apparatus 10 is illustrated in FIG. 7. As illustrated, the processing apparatus 10 includes an inter-face-image-group determination unit 11, an intra-face-image-group determination unit 12, a processing unit 13, an index data generation unit 14, and an object tracking unit 15.

The object tracking unit 15 gathers and groups face images in each of a plurality of frames of a person (object) tracked as the same object across the plurality of frames by use of an object tracking technique. Any conventional technique can be adopted as a technique for determining whether an object on an image is a person, or an object tracking technique.

The index data generation unit 14 generates index data having a hierarchical structure with a plurality of face images. Although details of processing of generating index data having a hierarchical structure with a plurality of face images are disclosed in PTLs 1 and 2, the processing is briefly described below.

Figure 8:
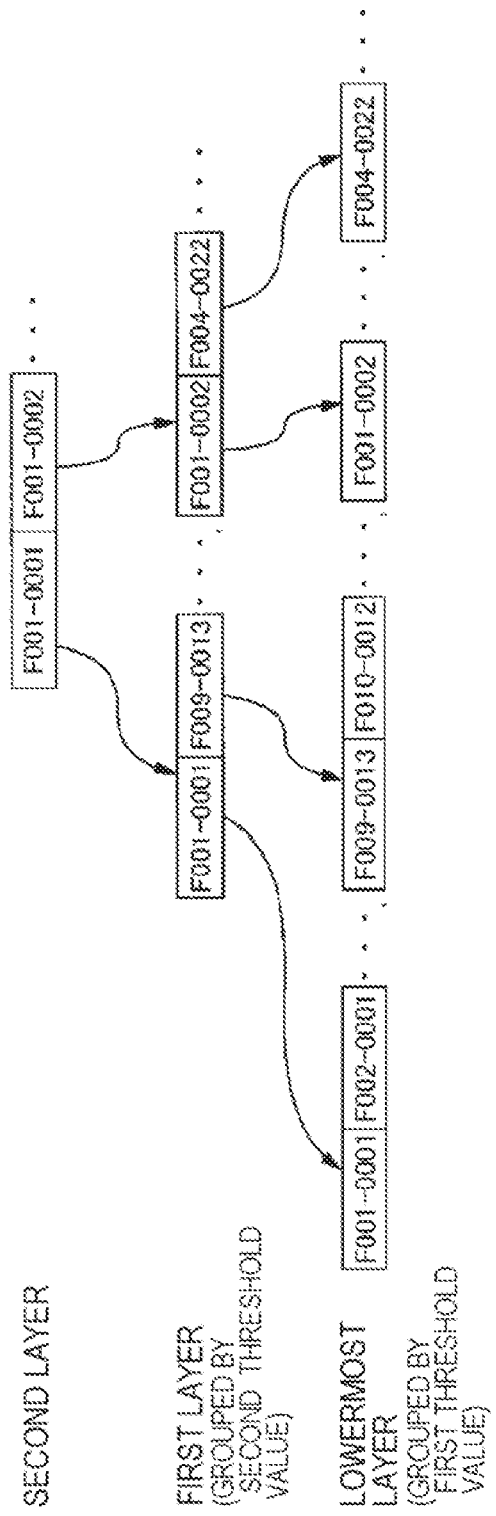
FIG. 8 is a diagram schematically illustrating one example of index data generated by the processing apparatus according to the present example embodiment.

One example of index data having a hierarchical structure is illustrated in FIG. 8. A face image ID: "Fooo-oooo" is identification information given to each face image extracted from an image in each frame. Fooo is a frame ID, and a hyphen is followed by an ID of each face image extracted from each frame. When face images of the same person are extracted from differing frames, a differing face image ID is given to each of the face images.

All processed face image IDs are arranged in a lowermost layer. Then, among a plurality of face image IDs arranged in the lowermost layer, face image IDs whose similarity score of face images is equal to or more than a first threshold value are gathered and grouped together.

One face image ID (representative) selected from each of a plurality of groups in the lowermost layer is arranged in a first layer. Each face image ID in the first layer is associated with a group (a group to which the face image ID belongs) of a selection source located in the lowermost layer. Then, among a plurality of face image IDs arranged in the first layer, face image IDs whose similarity score of face images is equal to or more than a second threshold value are gathered and grouped together. Note that, the second threshold value is lower than the first threshold value described above.

One face image ID (representative) selected from each of a plurality of groups in the first layer is arranged in a second layer. Each face image ID in the second layer is associated with a group (a group to which the face image ID belongs) of a selection source located in the first layer.

The index data are updated as follows. When a new face image ID is targeted for processing, the index data generation unit 14 first targets each of a plurality of face image IDs located in the second layer for a comparison with a new face image ID. In other words, the index data generation unit 14 forms a pair of the new face image ID and each of the plurality of face image IDs located in the second layer. Then, the index data generation unit 14 computes a similarity score (a similarity score of a feature of appearance) of face images for each pair, and determines whether the computed similarity score is equal to or more than the second threshold value.

When a face image ID whose similarity score is equal to or more than the second threshold value is not present in the second layer, the index data generation unit 14 adds the new face image ID of a processing target to the second layer, the first layer, and the lowermost layer, and associates the face image IDs with one another. In each of the first layer and the lowermost layer, a new group is generated by the added new face image ID.

On the other hand, when a face image ID whose similarity score is equal to or more than the second threshold value is present in the second layer, the index data generation unit 14 transfers a comparison target to the first layer. Specifically, a group in the first layer which is associated with a "face image ID, in the second layer, whose similarity score is determined to be equal to or more than the second threshold value" is targeted for a comparison.

Then, the index data generation unit 14 forms a pair of the new face image ID of a processing target and each of a plurality of face image IDs included in a group being a comparison target in the first layer. Subsequently, the index data generation unit 14 computes a similarity score of a face image for each pair, and determines whether the computed similarity score is equal to or more than the first threshold value. Note that, the first threshold value is higher than the second threshold value.

When a face image ID whose similarity score is equal to or more than the first threshold value is not present in the group being the comparison target in the first layer, the index data generation unit 14 adds the new face image ID of a processing target to the first layer and the lowermost layer, and associates the face image IDs with one another. In the first layer, the new face image ID of the processing target is added to the group being the comparison target. In the lowermost layer, a new group is generated by the new face image ID of the processing target.

On the other hand, when a face image ID whose similarity score is equal to or more than the first threshold value is present in the group of the comparison target in the first layer, the index data generation unit 14 adds the new face image ID of a processing target to the lowermost layer, in such a way that the face image ID belongs to the same group as a face image ID whose similarity score is equal to or more than the first threshold value.

In this way, the index data generation unit 14 locates all face images (face image IDs) in the lowermost layer, and generates, in the lowermost layer, a group in which face images whose similarity score is equal to or more than the first threshold value are gathered together. Then, the index data generation unit 14 extracts one face image from each group in the lowermost layer, locates the extracted face image in the first layer, and associates a face image located in the first layer with the group located in the lowermost layer to which each face image belongs.

Moreover, the index data generation unit 14 generates, in the first layer, a group in which face images whose similarity score is equal to or more than a second threshold value being lower than the first threshold value are gathered together. Then, the index data generation unit 14 extracts one face image from each group in the first layer, locates the extracted face image in the second layer, and associates a face image located in the second layer with the group located in the first layer to which each face image belongs. By the processing, the index data generation unit 14 generates index data having a hierarchical structure including at least the lowermost layer, the first layer, and the second layer. Note that, the number of layers is not limited to a three-layer structure described so far, and a structure having a different number of layers may be provided.

Figure 9:
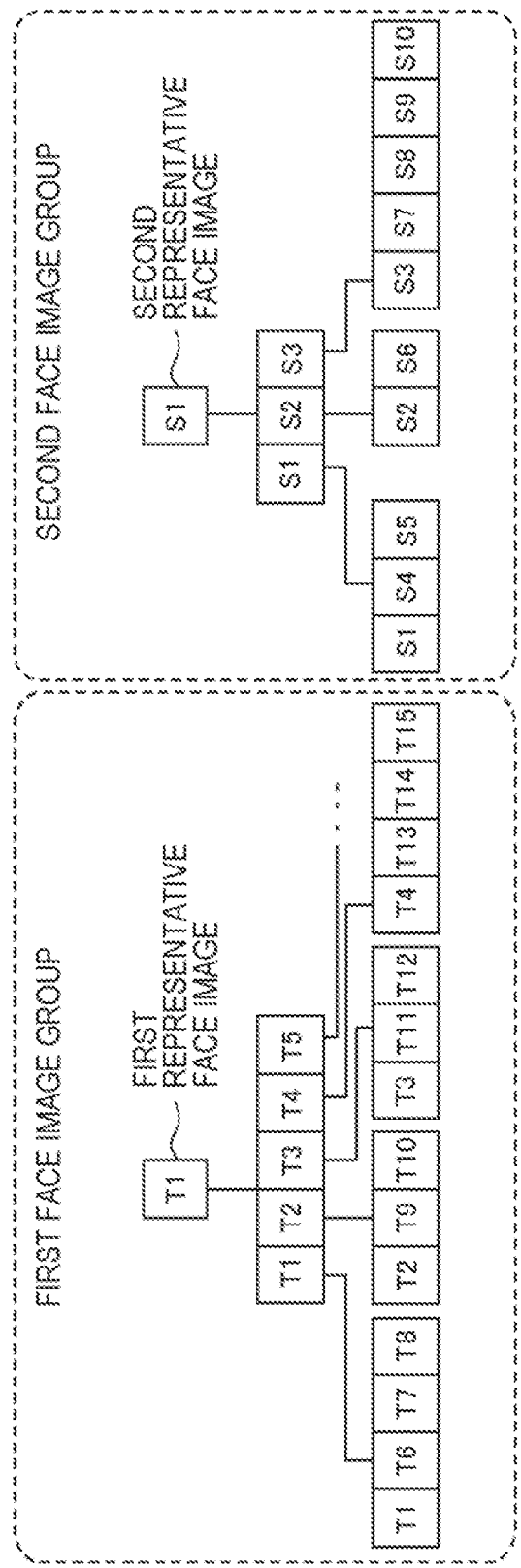
FIG. 9 is a diagram schematically illustrating one example of index data generated by the processing apparatus according to the present example embodiment.

As illustrated in FIG. 9, the index data generation unit 14 according to the present example embodiment generates index data having a hierarchical structure with a plurality of face images belonging to each group for each group generated by the object tracking unit 15 (for each group of face images determined to be of the same person by use of an object tracking technique). In other words, the index data generation unit 14 generates the same number of pieces of index data as the number of groups generated by the object tracking unit 15.

Then, as illustrated in FIG. 9, the inter-face-image-group determination unit 11, the intra-face-image-group determination unit 12, and the processing unit 13 execute the processing described in the first example embodiment, in such a way as to assume, as a first face image group, face images included in index data having one hierarchical structure, and assume, as a second face image group, face images included in index data having another hierarchical structure. In other words, the inter-face-image-group determination unit 11, the intra-face-image-group determination unit 12, and the processing unit 13 execute the processing described in the first example embodiment, in such a way as to assume, as a first face image group, face images belonging to one group in which face images determined to be of the same person by use of the object tracking technique are gathered, and assume, as a second face image group, face images belonging to another group generated by use of the object tracking technique.

Note that, the inter-face-image-group determination unit 11 and the intra-face-image-group determination unit 12 can assume, as a representative face image, a face image located in an uppermost layer of index data having a hierarchical structure. By determining a representative face image in this way, an appropriate representative face image can be easily determined.

Other configurations of the inter-face-image-group determination unit 11, the intra-face-image-group determination unit 12, and the processing unit 13 are similar to those according to the first example embodiment.

The processing apparatus 10 according to the present example embodiment described above can achieve an advantageous effect similar to that according to the first example embodiment.

Incidentally, a means for grouping together face images extracted from each of a plurality of frames by face images of the same person, based on only a similarity score between a plurality of face images is conceivable. However, in a case of the means, even face images of the same person become low in similarity score due to a direction, expression, sharpness, and the like of a face of each person in an image, and there can arise a disadvantage that the face images are not determined to be of the same person. On the other hand, when face images extracted from each of a plurality of frames are grouped together by face images of the same person, based on only the object tracking technique, there can arise a disadvantage that it is difficult to group face images or the like of the same person captured with differing cameras, face images of the same person who has once framed out and then framed in, or the like, as described above.

In the present example embodiment, the same person is tracked by the object tracking technique, face images of the person extracted from each frame are grouped together, and then a plurality of the face images are grouped together, based on a similarity score between a plurality of the face images. The processing apparatus 10 according to the present example embodiment can highly accurately group together face images extracted from each of a plurality of frames by face images of the same person.

Moreover, the processing apparatus 10 according to the present example embodiment groups together, by use of the technique described in the first example embodiment, face image groups in which face images determined to be of the same person by use of the object tracking technique are gathered, and therefore, can efficiently and highly accurately perform grouping.

As a result, with the processing apparatus 10 according to the present example embodiment, it becomes possible to efficiently and highly accurately group together face images extracted from each of a plurality of frames by face images of the same person.

Third Example Embodiment

The present example embodiment differs from the first example embodiment in generating index data having a hierarchical structure with a plurality of face images, and executing processing described in the first example embodiment by utilizing the index data. Moreover, the present example embodiment differs from the second example embodiment in a utilization method of index data. The present example embodiment is described below in detail.

One example of a hardware configuration of a processing apparatus 10 is similar to that according to each of the first and second example embodiments.

One example of a functional block diagram of the processing apparatus 10 is illustrated in FIG. 7. As illustrated, the processing apparatus 10 includes an inter-face-image-group determination unit 11, an intra-face-image-group determination unit 12, a processing unit 13, an index data generation unit 14, and an object tracking unit 15. A configuration of the object tracking unit 15 is similar to that according to the second example embodiment.

The index data generation unit 14 generates index data having one hierarchical structure with a plurality of face images extracted from an image. In other words, index data having a hierarchical structure are generated for each group of face images determined to be of the same person by use of an object tracking technique in the second example embodiment (see FIG. 9), whereas, in the present example embodiment, such grouping is not performed, and index data having one hierarchical structure are generated by use of all of a plurality of extracted face images (see FIG. 10). A generation method of index data is as described in the second example embodiment.

Then, the inter-face-image-group determination unit 11, the intra-face-image-group determination unit 12, and the processing unit 13 execute the processing described in the first example embodiment, in such a way as to assume, as a first face image group, a plurality of face images being associated with a first image located in a predetermined layer of which a threshold value (a first threshold value, a second threshold value, and the like) used for grouping face images set in relation to each layer used during index data generation is equal to or more than a reference value, and assume, as a second face image group, a plurality of face images being located in the predetermined layer described above and being associated with a second image belonging to the same group as the first image.

Note that, the inter-face-image-group determination unit 11 and the intra-face-image-group determination unit 12 can determine the first image located in the predetermined layer described above as a first representative image, and determine the second image located in the predetermined layer described above as a second representative image. By determining a representative face image in this way, an appropriate representative face image can be easily determined.

Figure 10:
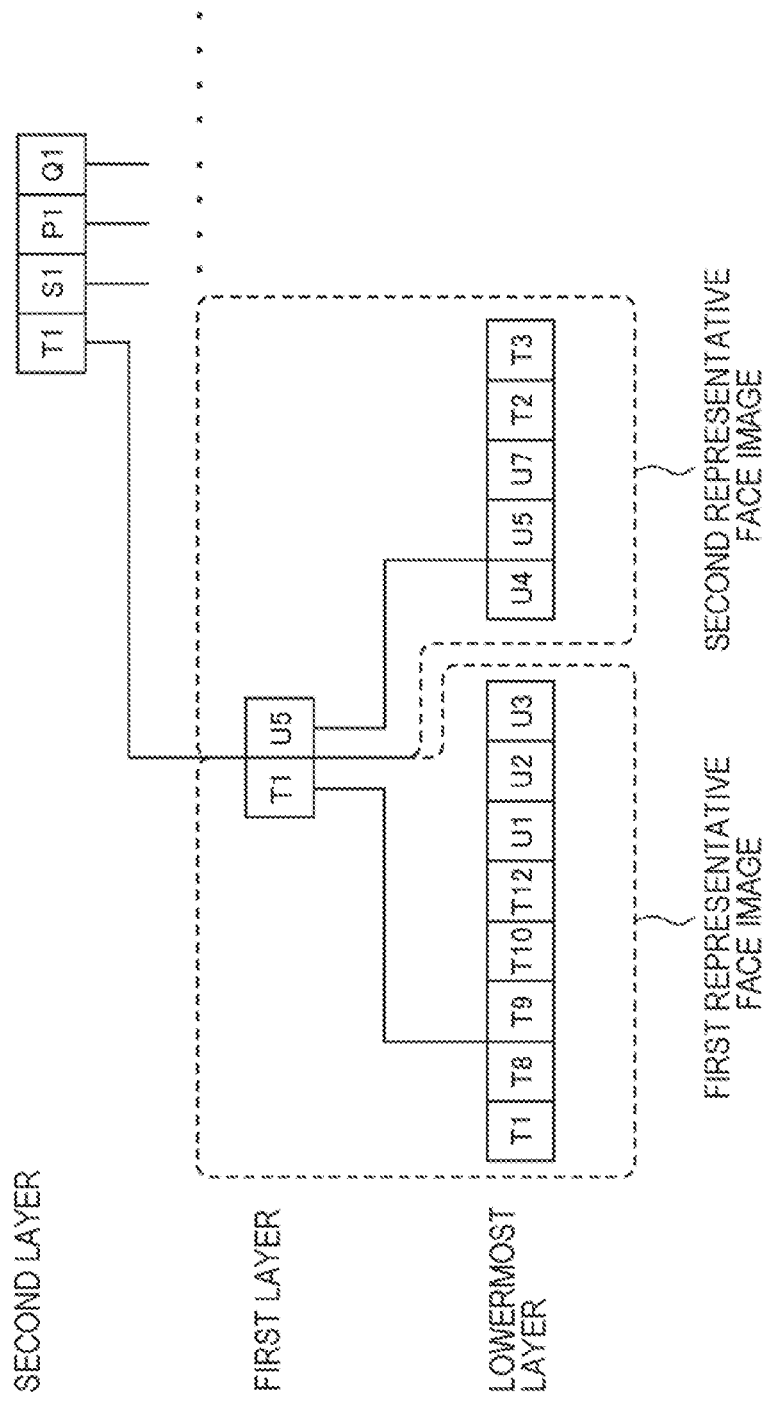
FIG. 10 is a diagram schematically illustrating one example of index data generated by the processing apparatus according to the present example embodiment.

For example, in the example of FIG. 10, a first layer is determined as a predetermined layer whose threshold value is equal to or more than a reference value. A face image T1 and a face image U5 have a similarity score being equal to or more than a threshold value, and belong to the same group in the predetermined layer described above.

In a case of this example, the face image T1 and a face image in a layer lower than that being associated with the face image T1 constitute a first face image group. Then, the face image U5 and a face image in a layer lower than that being associated with the face image U5 constitute a second face image group. The face image T1 is a first representative image, and the face image U5 is a second representative image.

Note that, in FIG. 10, the same alphabet is given to face images determined to be of the same person by use of an object tracking technique. In other words, a plurality of face images given the alphabet T are a collection of face images determined to be of the same person by use of the object tracking technique. Similarly, a plurality of face images given each of alphabets S, P, Q, U, and the like are a collection of face images determined to be of the same person by use of the object tracking technique.

Determination of a second condition (face images whose similarity score to a representative face image is equal to or more than a predetermined level exist in a face image group in a predetermined ratio or more) in a case of this example may be performed by use of only a face image determined to be of the same person as a representative face image in a face image group by use of the object tracking technique. In other words, in the first face image group in FIG. 10, determination of the second condition may be performed by use of only a face image given the alphabet T. Similarly, in the second face image group in FIG. 10, determination of the second condition may be performed by use of only a face image given the alphabet U. Note that, determination of the second condition may be performed by use of all face images included in a face image group.

The processing apparatus 10 according to the present example embodiment described above can achieve an advantageous effect similar to that according to each of the first and second example embodiments. Moreover, the present example embodiment can select, as a representative face image from a face image group, an image being similar to all other images at a predetermined level or more. In other words, the present example embodiment can efficiently determine a face image being preferable as a representative face image.

Supplementary notes of an example of a referential form are set forth below.

1. A processing apparatus including:
   an inter-face-image-group determination means for determining whether a similarity score between a first representative face image in a first face image group and a second representative face image in a second face image group satisfies a first condition;

an intra-face-image-group determination means for determining, for each of the first face image group and the second face image group, whether a second condition defining a relationship between the representative face image and another image in the face image group is satisfied, based on a similarity score between the first representative face image and each of other face images in the first face image group and a similarity score between the second representative face image and each of other face images in the second face image group; and a processing means for associating a same person identifier (ID) with a plurality of face images included in the first face image group and the second face image group when it is determined that the first condition is satisfied and that the first face image group and the second face image group each satisfy the second condition.

2. The processing apparatus according to supplementary note 1, wherein
the second condition is "face images whose similarity score to the representative face image is equal to or more than a predetermined level exist in the face image group in a predetermined ratio or more".

3. The processing apparatus according to supplementary note 1 or 2, further including
an object tracking means for gathering and grouping face images determined to be of a same person by use of an object tracking technique, wherein
the inter-face-image-group determination means, the intra-face-image-group determination means, and the processing means assume, as the first face image group, face images belonging to one group generated by use of the object tracking technique, and assume, as the second face image group, face images belonging to another group generated by use of the object tracking technique.

4. The processing apparatus according to supplementary note 3, further including
an index data generation means for generating index data having a hierarchical structure with a plurality of face images, wherein
the index data generation means
locates all face images in a lowermost layer,
generates, in the lowermost layer, a group in which face images whose similarity score is equal to or more than a first threshold value are gathered together, extracts one face image from each group, locates the extracted face image in a first layer, and associates a face image located in the first layer with the group located in the lowermost layer to which each face image belongs, and
generates, in the first layer, a group in which face images whose similarity score is equal to or more than a second threshold value being lower than the first threshold value are gathered together, extracts one face image from each group, locates the extracted face image in a second layer, associates a face image located in the second layer with the group located in the first layer to which each face image belongs, and thereby generates index data having the hierarchical structure including at least the lowermost layer, the first layer, and the second layer.

5. The processing apparatus according to supplementary note 4, wherein
the index data generation means generates index data having the hierarchical structure for each group of face images determined to be of a same person by use of an object tracking technique, and
the inter-face-image-group determination means, the intra-face-image-group determination means, and the processing means assume, as the first face image group, face images included in index data having the one hierarchical structure, and assume, as the second face image group, face images included in index data having the another hierarchical structure.

6. The processing apparatus according to supplementary note 5, wherein
the inter-face-image-group determination means and the intra-face-image-group determination means assume a face image located in an uppermost layer as the representative face image.

7. The processing apparatus according to supplementary note 4, wherein
the index data generation means generates index data having the hierarchical structure with a plurality of face images extracted from an image, and
the inter-face-image-group determination means, the intra-face-image-group determination means, and the processing means assume, as the first face image group, a plurality of face images being associated with a first image located in a predetermined layer of which the threshold value is equal to or more than a reference value, and assume, as a second face image group, a plurality of face images being located in the predetermined layer and being associated with a second image belonging to a same group as the first image.

8. The processing apparatus according to supplementary note 7, wherein
the inter-face-image-group determination means and the intra-face-image-group determination means assume the first image as the first representative face image, and assume the second image as the second representative face image.

9. A processing method executing:
by a computer,
an inter-face-image-group determination step of determining whether a similarity score between a first representative face image in a first face image group and a second representative face image in a second face image group satisfies a first condition;
an intra-face-image-group determination step of determining, for each of the first face image group and the second face image group, whether a second condition defining a relationship between the representative face image and another image in the face image group is satisfied, based on a similarity score between the first representative face image and each of other face images in the first face image group and a similarity score between the second representative face image and each of other face images in the second face image group; and
a processing step of associating a same person identifier (ID) with a plurality of face images included in the first face image group and the second face image group when it is determined that the first condition is satisfied and that the first face image group and the second face image group each satisfy the second condition.

10. A program that causes a computer to function as:
  an inter-face-image-group determination means for determining whether a similarity score between a first representative face image in a first face image group and a second representative face image in a second face image group satisfies a first condition;
  an intra-face-image-group determination means for determining, for each of the first face image group and the second face image group, whether a second condition defining a relationship between the representative face image and another image in the face image group is satisfied, based on a similarity score between the first representative face image and each of other face images in the first face image group and a similarity score between the second representative face image and each of other face images in the second face image group; and
  a processing means for associating a same person identifier (ID) with a plurality of face images included in the first face image group and the second face image group when it is determined that the first condition is satisfied and that the first face image group and the second face image group each satisfy the second condition.

This application is based upon and claims the benefit of priority from Japanese patent application No. 2019-048454, filed on Mar. 15, 2019, the disclosure of which is incorporated herein in its entirety by reference.

What is claimed is:
1. A processing apparatus comprising:
  at least one memory configured to store one or more instructions; and
  at least one processor configured to execute the one or more instructions to:
    determine whether a similarity score between a first representative face image in a first face image group and a second representative face image in a second face image group satisfies a first condition;
    determine, based on a similarity score between the first representative face image and each other face image in the first face image group, whether a relationship between the first representative face and the other face images in the first face image group satisfies a second condition;
    determine, based on a similarity score between the second representative face image and each other face image in the second face image group, whether a relationship between the second representative face and the other face images in the second face image group satisfies the second condition; and
    associate a same person identifier with a plurality of face images included in each of the first face image group and the second face image group when it is determined that the first condition is satisfied and that the first face image group and the second face image group each satisfy the second condition.
2. The processing apparatus according to claim 1, wherein the second condition indicates that face images whose similarity score to the representative face image is equal to or more than a predetermined level exist in the face image group in a predetermined ratio or more.
3. The processing apparatus according to claim 1, wherein the processor is further configured to execute the one or more instructions to:
  gather and group face images determined to be of a same person by use of an object tracking technique, and
  assume, as the first face image group, face images belonging to one group generated by use of the object tracking technique, and assume, as the second face image group, face images belonging to another group generated by use of the object tracking technique.
4. The processing apparatus according to claim 3, wherein the processor is further configured to execute the one or more instructions to:
  generate index data having a hierarchical structure with a plurality of face images, locate all face images in a lowermost layer,
  generate, in the lowermost layer, a group in which face images whose similarity score is equal to or more than a first threshold value are gathered together, extract one face image from each group, locate the extracted face image in a first layer, and associate a face image located in the first layer with the group located in the lowermost layer to which each face image belongs, and
  generate, in the first layer, a group in which face images whose similarity score is equal to or more than a second threshold value being lower than the first threshold value are gathered together, extract one face image from each group, locate the extracted face image in a second layer, associate a face image located in the second layer with the group located in the first layer to which each face image belongs, and thereby generate index data having the hierarchical structure including at least the lowermost layer, the first layer, and the second layer.
5. The processing apparatus according to claim 4, wherein the processor is further configured to execute the one or more instructions to:
  generate index data having the hierarchical structure for each group of face images determined to be of a same person by use of an object tracking technique, and
  assume, as the first face image group, face images included in index data having the one hierarchical structure, and assume, as the second face image group, face images included in index data having the another hierarchical structure.
6. The processing apparatus according to claim 5, wherein the processor is further configured to execute the one or more instructions to assume a face image located in an uppermost layer as the representative face image.
7. The processing apparatus according to claim 4, wherein the processor is further configured to execute the one or more instructions to:
  generate index data having the hierarchical structure with a plurality of face images extracted from an image, and
  assume, as the first face image group, a plurality of face images being associated with a first image located in a predetermined layer of which the threshold value is equal to or more than a reference value, and assume, as a second face image group, a plurality of face images being located in the predetermined layer and being associated with a second image belonging to a same group as the first image.
8. The processing apparatus according to claim 7, wherein the processor is further configured to execute the one or more instructions to assume the first image as the first representative face image, and assume the second image as the second representative face image.
9. A processing method executed by a computer, the method comprising:
  determining whether a similarity score between a first representative face image in a first face image group and a second representative face image in a second face image group satisfies a first condition;

determining, based on a similarity score between the first representative face image and each other face image in the first face image group, whether a relationship between the first representative face and the other face images in the first face image group satisfies a second condition;

determining, based on a similarity score between the second representative face image and each other face image in the second face image group, whether a relationship between the second representative face and the other face images in the second face image group satisfies the second condition; and associating a same person identifier with a plurality of face images included in the first face image group and the second face image group when it is determined that the first condition is satisfied and that the first face image group and the second face image group each satisfy the second condition.

10. A non-transitory storage medium storing a program that causes a computer to:

determine whether a similarity score between a first representative face image in a first face image group and a second representative face image in a second face image group satisfies a first condition;

determine, based on a similarity score between the first representative face image and each other face image in the first face image group, whether a relationship between the first representative face and the other face images in the first face image group satisfies a second condition;

determine, based on a similarity score between the second representative face image and each other face image in the second face image group, whether a relationship between the second representative face and the other face images in the second face image group satisfies the second condition; and associate a same person identifier with a plurality of face images included in the first face image group and the second face image group when it is determined that the first condition is satisfied and that the first face image group and the second face image group each satisfy the second condition.

* * * * *